United States Patent
Beaver et al.

(10) Patent No.: US 11,847,724 B2
(45) Date of Patent: Dec. 19, 2023

(54) NEAR REAL-TIME VISUALIZATIONS FOR INTELLIGENT VIRTUAL ASSISTANT RESPONSES

(71) Applicant: Verint Americas Inc., Alpharetta, GA (US)

(72) Inventors: Ian Roy Beaver, Spokane, WA (US); Ted Mark Matsumura, Spokane, WA (US)

(73) Assignee: Verint Americas Inc., Alpharetta, GA (US)

(*) Notice: Subject to any disclaimer, the term of this patent is extended or adjusted under 35 U.S.C. 154(b) by 117 days.

(21) Appl. No.: 16/934,442

(22) Filed: Jul. 21, 2020

(65) Prior Publication Data
US 2022/0028138 A1    Jan. 27, 2022

(51) Int. Cl.
G06T 11/60 (2006.01)
G06F 16/904 (2019.01)
G06F 16/9032 (2019.01)
G06F 40/49 (2020.01)

(52) U.S. Cl.
CPC ............ *G06T 11/60* (2013.01); *G06F 16/904* (2019.01); *G06F 16/90332* (2019.01); *G06F 40/49* (2020.01)

(58) Field of Classification Search
CPC .. G06F 16/90332; G06F 16/904; G06F 40/49; G06Q 10/10; G06Q 30/016; G06Q 30/0617; G06T 11/60
See application file for complete search history.

(56) References Cited

U.S. PATENT DOCUMENTS

| | | | |
|---|---|---|---|
| 10,108,998 B2* | 10/2018 | Junge | G06Q 30/0617 |
| 2014/0282003 A1* | 9/2014 | Gruber | G06F 3/165 |
| | | | 715/727 |
| 2016/0180222 A1* | 6/2016 | Sierhuis | G06Q 10/06398 |
| | | | 706/47 |
| 2016/0350825 A1* | 12/2016 | Hertschuh | G06Q 30/0617 |
| 2017/0068423 A1* | 3/2017 | Napolitano | G06F 16/90332 |
| 2019/0057698 A1* | 2/2019 | Raanani | G06F 3/167 |
| 2019/0236142 A1 | 8/2019 | Balakrishnan et al. | |
| 2019/0236205 A1* | 8/2019 | Jia | G06F 16/3329 |
| 2019/0258700 A1* | 8/2019 | Beaver | G06F 40/117 |

(Continued)

FOREIGN PATENT DOCUMENTS

| | | | | |
|---|---|---|---|---|
| EP | 3073422 | | 9/2016 | |
| WO | WO-2017044260 A1 * | | 3/2017 | ....... G06F 16/90332 |
| WO | 2019/032996 | | 2/2019 | |

OTHER PUBLICATIONS

International Search Report and Written Opinion, dated Oct. 28, 2021, received in connection with corresponding International Patent Application No. PCT/US2021/042538.

*Primary Examiner* — Chau T Nguyen
(74) *Attorney, Agent, or Firm* — Meunier Carlin & Curfman LLC (57) ABSTRACT

A real-time conversation is monitored between a user and an intelligent virtual assistant (IVA). A visualization may be generated and displayed to the user on the user computing device based on one or more topics identified in the conversation. The conversation between the user and the IVA may continue and is continued to be monitored. The visualization can be updated as the conversation continues, e.g., based on further topics being identified.

19 Claims, 5 Drawing Sheets

(56) References Cited

U.S. PATENT DOCUMENTS

| | | |
|---|---|---|
| 2020/0106881 A1 | 4/2020 | Beaver et al. |
| 2020/0127988 A1* | 4/2020 | Bradley .................. G06F 3/165 |
| 2021/0006657 A1* | 1/2021 | Adibi ................ G06F 16/90335 |
| 2022/0043983 A1* | 2/2022 | Ayers ...................... G06F 40/40 |

\* cited by examiner

NEAR REAL-TIME VISUALIZATIONS FOR INTELLIGENT VIRTUAL ASSISTANT RESPONSES

BACKGROUND

Currently, intelligent virtual assistants (IVAs) and chatbots either do not know about precise real-time data during an IVA session, and at best display a link to an external website that will provide that information, or simply provide data that was current at the time the IVA inputs and responses were last updated.

Thus, an IVA may not be able to provide the information the user immediately needs or desires, resulting in an unsatisfactory user experience. It is desirable to provide the real-time information or other content that a user wants, so the user does not have to leave the IVA to find that information or content.

SUMMARY

A real-time conversation is monitored between a user and an intelligent virtual assistant (IVA). A visualization may be generated and displayed to the user on the user computing device based on one or more topics identified in the conversation. The conversation between the user and the IVA may continue and is continued to be monitored. The visualization can be updated as the conversation continues, e.g., based on further topics being identified.

Systems and methods are provided for creating an additional response service within an IVA that can dynamically generate visualizations based on the current topic of conversation with a specific user. Dynamic graphs are produced of externally queried real-time data sources that are relevant to the current topic of conversation with an IVA.

In an implementation, a system for providing a visualization includes an intelligent virtual assistant (IVA) configured to receive natural language processing (NLP) inputs from a user computing device; and a computing device in communication with the IVA and configured to generate a visualization based on the NLP inputs and provide the visualization for display on the user computing device.

In an implementation, method for providing a visualization includes monitoring a conversation between a user computing device and an intelligent virtual assistant (IVA); generating a visualization based on a topic in the conversation; and providing the visualization for display on the user computing device.

In an implementation, a system for providing a visualization includes a visualization determination module configured to monitor a conversation between a user computing device and an intelligent virtual assistant (IVA); a data gathering module configured to retrieve data from at least one of an internal data source or an external data source based on a topic in the conversation; a data processing module configured to process the retrieved data; and a visualization generation module configured to generate a visualization based on the processed data and provide the visualization for display on the user computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
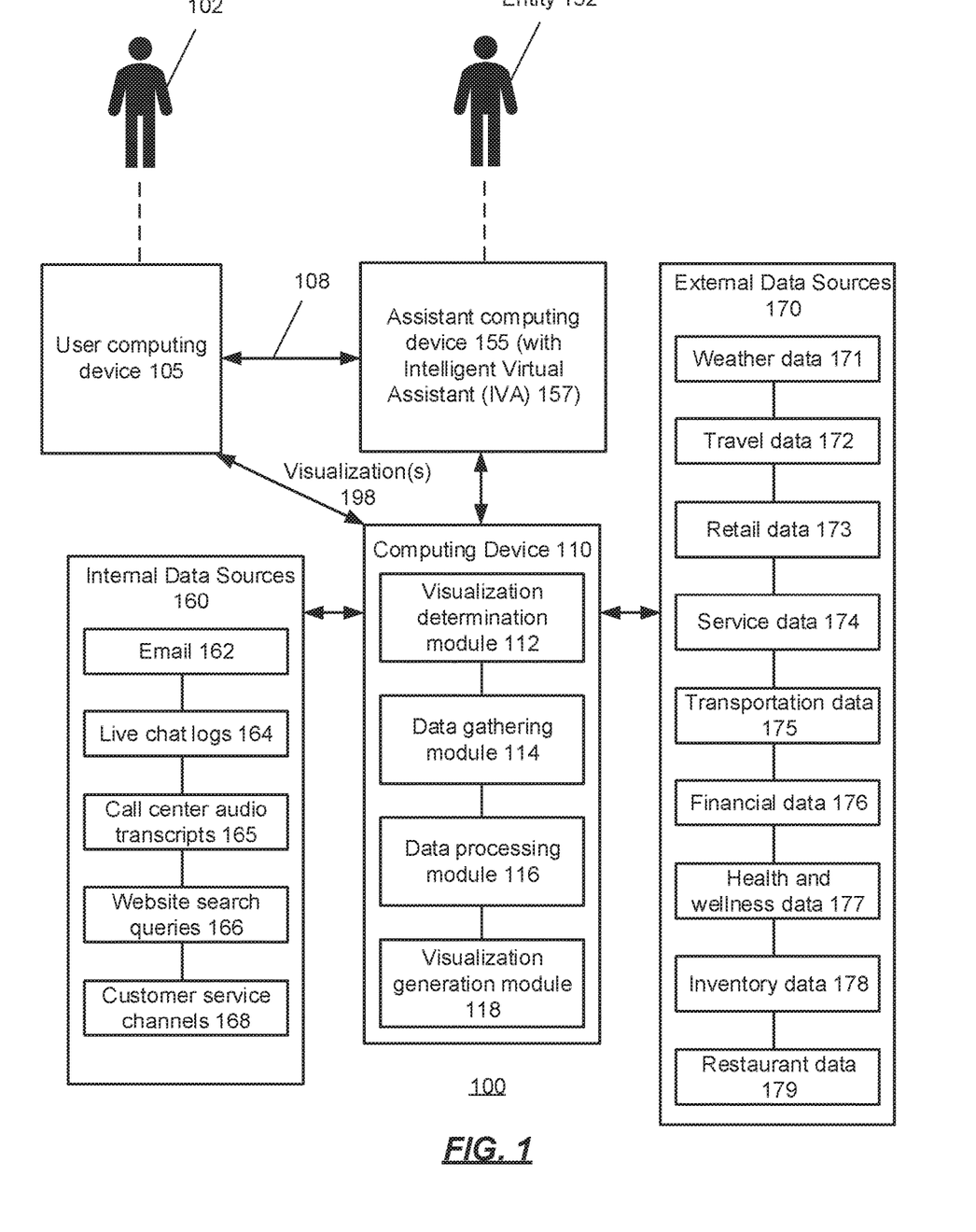
FIG. 1 is an illustration of an exemplary environment for real-time or near real-time visualizations for intelligent virtual assistant (IVA) responses.

FIG. 1 is an illustration of an exemplary environment 100 for real-time or near real-time visualizations 198 for intelligent virtual assistant (IVA) 157 responses. It is determined that a visualization 198 is to be generated and displayed based on topic identification (e.g., weather, finance, location, etc.). The topic is identified from conversation between a user 102 and the IVA 157. It is determined if the topic had been predetermined to have a visualization (e.g., if there is visualization information for the topic). If so, then the information is retrieved or otherwise determined or obtained for the topic and a visualization 198 is generated. The visualization 198 is then displayed on the user's display. In some implementations, if the conversation gets escalated to an agent (from the IVA 157), then the visualization 198 may also be displayed on the display.

The visualizations 198 may be dynamic and may be take the form of graphs or other representations, depending on the implementation. The visualizations 198 may be generated based on queried internal and/or external data sources (real-time and/or non-real-time) that are relevant to the current topic of conversation between a user 102 and the IVA 157. In this manner, the user 102 is provided with the relevant information in a conversation with an IVA 157 so the user 102 can complete their transaction, rather than navigating the user 102 to an informational page within a website or giving the user 102 a link to an external website thereby decreasing the user's focus with the IVA 157 and decreasing the likelihood of the user 102 completing their transaction.

A user 102, using a user computing device 105, such as a smartphone, a tablet, or a laptop computer, communicates with an assistant computing device 155 associated with an entity 152 through a network 108 (e.g., the Internet). The entity 152 may be an individual or a business, company, or organization, for example, that provides a product or service, or access to a product or service, to the user 102 via the network 108.

The user 102 may communicate with the assistant computing device 155 via the user computing device 105 and an intelligent virtual assistant (IVA) 157 of the assistant computing device 155. The user computing device 105 (and thus the user 102) may interact with the IVA 157 using natural language processing (NLP) associated with, or implemented by, the IVA 157. Any known NLP methods may be used to interact with the user 102 and to determine the current topic of conversation between the user 102 (and the user computing device 105) and the IVA 157.

A computing device 110 may be in communication with the assistant computing device 155 and/or the user computing device 105 to monitor the speech in a voice call (i.e., the conversation) or other communication between the user computing device 105 and the assistant computing device 155 (e.g., the IVA 157). The computing device 110 may be implemented in, or embodied in, a desktop analytics product or in a speech analytics product, in some implementations.

The computing device 110 may include a visualization determination module 112, a data gathering module 114, a data processing module 116, and a visualization generation module 118. In some implementations, the computing device 110 may be comprised within the assistant computing device 155. In some implementations, one or more of the visualization determination module 112, the data gathering module 114, the data processing module 116, and the visualization generation module 118 may be comprised within the assistant computing device 155 or another computing device (not shown).

The network 108 may be a variety of network types including the public switched telephone network (PSTN), a cellular telephone network, and a packet switched network (e.g., the Internet). Although only one user computing device 105, one assistant computing device 155, and one computing device 110 are shown in FIG. 1, there is no limit to the number of computing devices 105, 155, 110 that may be supported.

Figure 5:
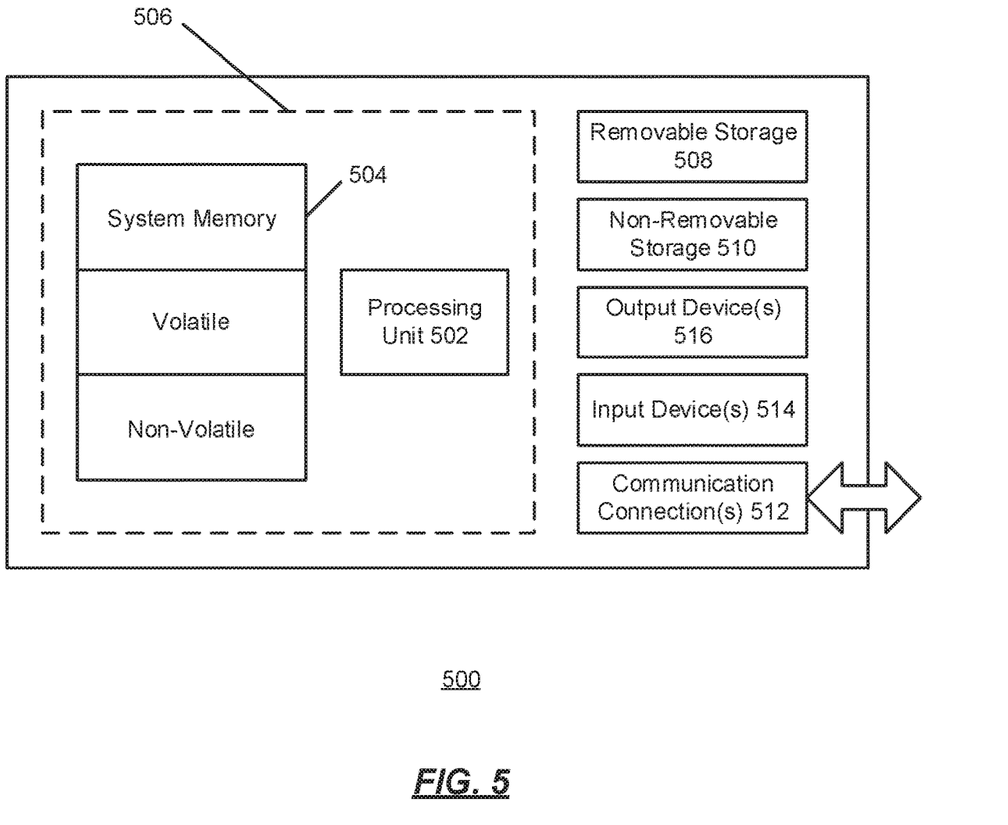
FIG. 5 shows an exemplary computing environment in which example embodiments and aspects may be implemented.

The user computing device 105, the assistant computing device 155, and the computing device 110, may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 5 as the computing device 500.

In some implementations, the computing device 110 is in communication with, and is configured to receive data from, one or more internal data sources 160 and/or or more external data sources 170. The IVA 157 may cover a variety of media channels in addition to voice, including, but not limited to social media, email, SMS/MMS, IM, etc. Additionally, the assistant computing device 155 can access and interact with one or more websites as additional sources of real-time data and/or non-real-time data that can be used in generating a visualization 198.

The visualization determination module 112 is provided and configured to determine whether a relevant visualization 198 should be created for the given user input based on the current topic of conversation. If so, a visualization generation module 118 is provided and configured to generate the visualization 198 and provide the visualization 198 to the user computing device 105 for display to the user 102 during the conversation between the user 102 (via the user computing device 105) and the IVA 157.

The data gathering module 114 is configured to gather, obtain, or otherwise receive data from the internal data sources 160 and/or the external data sources 170 based on the topic identified by the visualization determination module. The internal data sources 160 may comprise one or more of email 162, live chat logs, call center audio transcripts 165, website search queries 166, and customer service channels 168, for example. The external data sources 170 may comprise sources of weather data 171, travel data 172, retail data 173, service data 174, transportation data 175, financial data 176, health and wellness data 177, inventory data 178, and restaurant data 179, for example.

The data processing module 116 of the computing device 110 processes the data retrieved from the data gathering module 114 to obtain the proper data from the retrieved data (e.g., remove redundancies, remove irrelevant data, etc.) and/or put the data into proper format for subsequent visualization generation and provides the processed data to the visualization generation module 118.

The visualization generation module 118 of the computing device 110 generates a visualization 198 using the processed data and provides the visualization 198 to the user computing device 105 for display to the user. The visualization 198 may be displayed for a predetermined length of time or until a predetermined event occurs, for example.

The data provided in the visualizations 198 may comprise non-real-time data from external data sources (e.g., historical weather data, historical financial data, etc.) and/or real-time and/or non-real-time data from internal data sources. Data that may be relevant to the conversation, regardless of whether real-time or non-real-time, and from external data sources or internal data sources, may be obtained and incorporated into a visualization 109 that is displayed to the user 102 (e.g., on a display of the computing device 105 that the user 102 is using to communicate with the IVA 157). For example, for a weather station, an API may be implemented that goes to the appropriate relevant URL and the real-time data may thus be obtained from that external data source directed to weather data 171, and a visualization 198 (e.g., one or more graphs) may be generated and displayed.

In some implementations, such as when as conversation gets passed from the IVA 157 to an agent of the entity who may be using the assistant computing device 155 (or another computing device), the computing device 110 may also provide the visualization 198 to the assistant computing device 155 (or another computing device) for display to the agent who is having the conversation with the user 102 (via the user computing device 105).

In some implementations, the conversation may be continuously monitored (or periodically monitored, or randomly monitored, depending on the implementation) and the visualization 198 may be updated based on the topic(s) that are identified during this continuous (or periodic, or random) monitoring.

Aspects of the invention are relevant as an add-on to IVA/IVR (intelligent virtual assistant/interactive voice response) services, as a service is provided that presents visualizations and/or other content to users based on real-time data (and/or non-real-time data) from external data sources (and/or internal data sources).

In some implementations, during the response generation phase of an IVA, the system will determine whether a data source (e.g., one or more of the internal data sources 160 or the external data sources 170) exists for generation of a relevant visualization 198 to the selected response, using the context and/or topic of the conversation. If a data source exists, the response generation phase will generate a visualization 198 of the data in a form that is optimal for the current response and display the visualization 198 to the user along with a text and/or audio response, if any.

Some aspects may be implemented as an IVA client on the user computing device 102, communicating to the existing IVA 157 back end platform and database. Instead of just a textual or audio response generation service for creating responses to user inputs to the IVA 157, there is an additional visualization generation service (e.g., comprising the visualization determination module 112, the data gathering module 114, the data processing module 116, and the visualization generation module 118) that determines whether a relevant visualization should be created for the given user input. This may be implemented as a platform API on the back end service that would field known queries via API and plug-ins to known public (or private/paid) services or programs that could generate a current dynamic weather, financial, currency exchange, health and wellness, inventory status, restaurant status, etc. or any query that is likely to be of more use to the user if it were current data, due to changing conditions over time, as opposed to a static database result such as pre-generated images.

An example is when considering travel, on a travel related IVA 157 or chatbot, a user 102 may have questions relating to conditions such as weather, state department, or CDC warnings, etc. Rather than navigating the user 102 to an informational page within the current website or giving them a link to an external website, the idea is to keep the focus of the user 102 within the IVA 157, while providing relevant information to the user 102, so they can complete their transaction.

One example is the current COVID-19 situation. Because the situation in different regions is changing daily, it is important for a traveler to know what the current restrictions and safety levels. Many travel, retail, service, or transportation IVAs will have static text stating that conditions may change, and urge the user to do their own research.

By enabling tools written by programmers which access publicly available statistics, such as up to the hour death or infection rates of COVID-19 in different states, and dynamically graphing the trend as part of the response to a user question on the subject, the user can make an informed decision as to whether the situation, based on up to the hour data, is favorable to continue the transaction.

While a travel website may have a weather tool showing the weather forecast for the proposed trip dates, it does not have a conversationally-customized comparison, or plotted chart of averages that a software program running on weather data would be able to provide. Providing this kind of deeper data and comparisons, without having to leave the IVA 157 conversational window, can keep the focus of the user 102 on the pending transaction within the IVA 157 without resorting to directing them to links to other information sources such as weather websites, and hoping the user 102 returns to the IVA 157 to complete the transaction.

The types of IVAs that this may apply include, for example and without limitation: (1) travel, or travel and health conditions as the above example indicates; (2) financial trading or portfolio management, where custom charts of current and historical data impact decisions can be drawn based on user queries; (3) retail comparisons of pricing, return policies, third party review sources; and (4) health or medical IVAs where drug interactions can be looked up without leaving the IVA 157.

Figure 2:
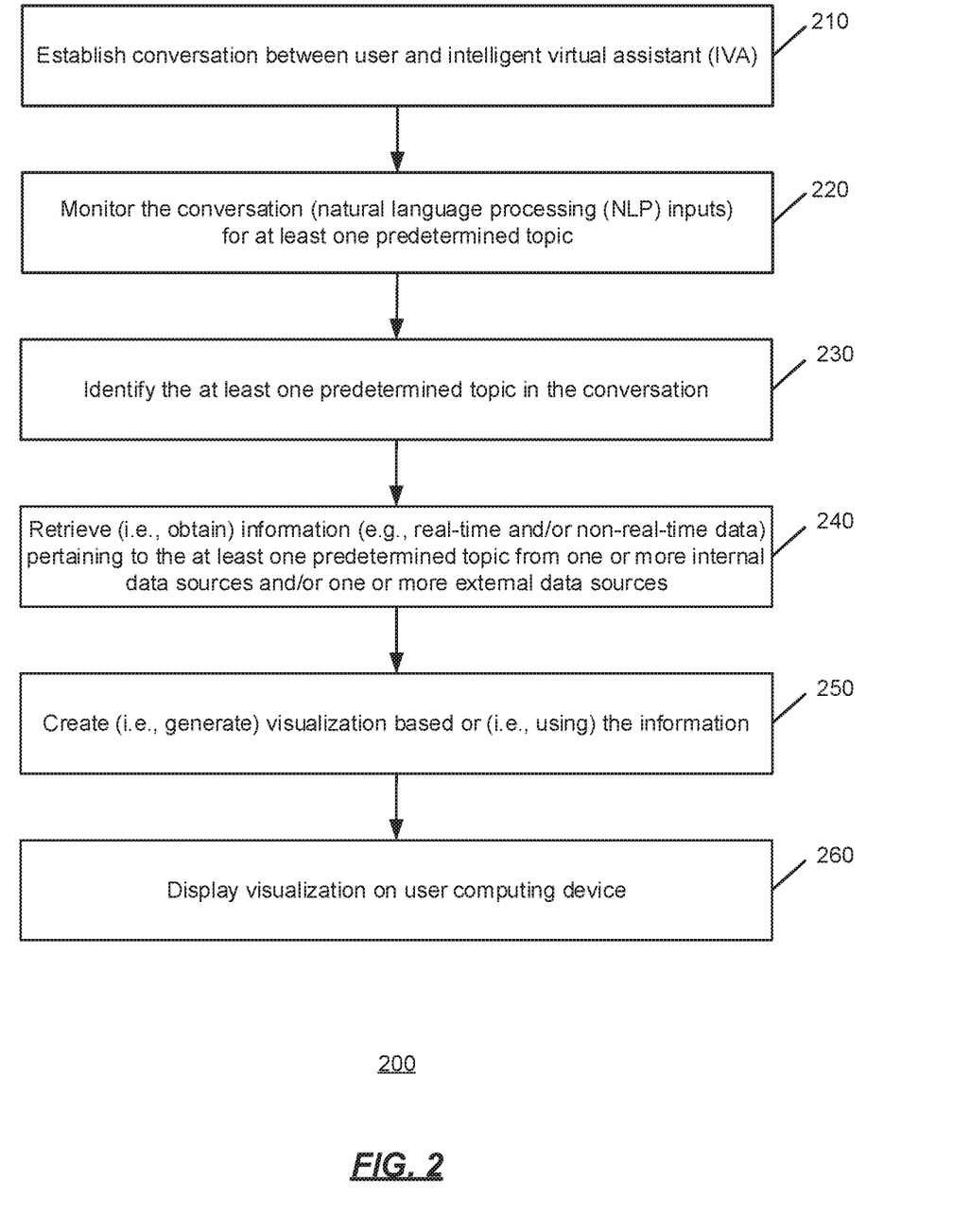
FIG. 2 is an operational flow of an implementation of a method of providing a visualization to a user computing device during a conversation between a user and an IVA.

FIG. 2 is an operational flow of an implementation of a method 200 of providing a visualization 198 to a user computing device 105 during a conversation between a user 102 and an IVA 157.

At 210, a conversation is established between the user 102 (and the user computing device 105 and the IVA 157. At 220, the conversation is monitored by the visualization determination module 112 for detection of at least one predetermined topic. Alternatively or additionally, in some implementations, the conversation may be monitored for context and/or sentiment, and visualizations may be generated and displayed responsive to detection of context and/or sentiment along with or instead of identified topic. At 230, at least one predetermined topic is identified in the conversation, e.g., by the visualization determination module 112.

At 240, information pertaining to the identified topic is retrieved or otherwise obtained from the data source(s) that had been associated with that topic previously (e.g., by an administrator or other user associated with the entity 152 or the IVA 157). Each data source may be real-time or non-real-time, and may be an internal data source or an external data source. The information (i.e., the real-time and/or non-real-time data) may be retrieved or otherwise obtained by the data gathering module 114. The retrieved data may then processed by the data processing module 116 if appropriate depending on the implementation.

At 250, a visualization (or visualizations) are created (i.e., generated) by the visualization generation module 118, and transmitted or otherwise provided to the user computing device 105 for display at 260.

Figure 3:
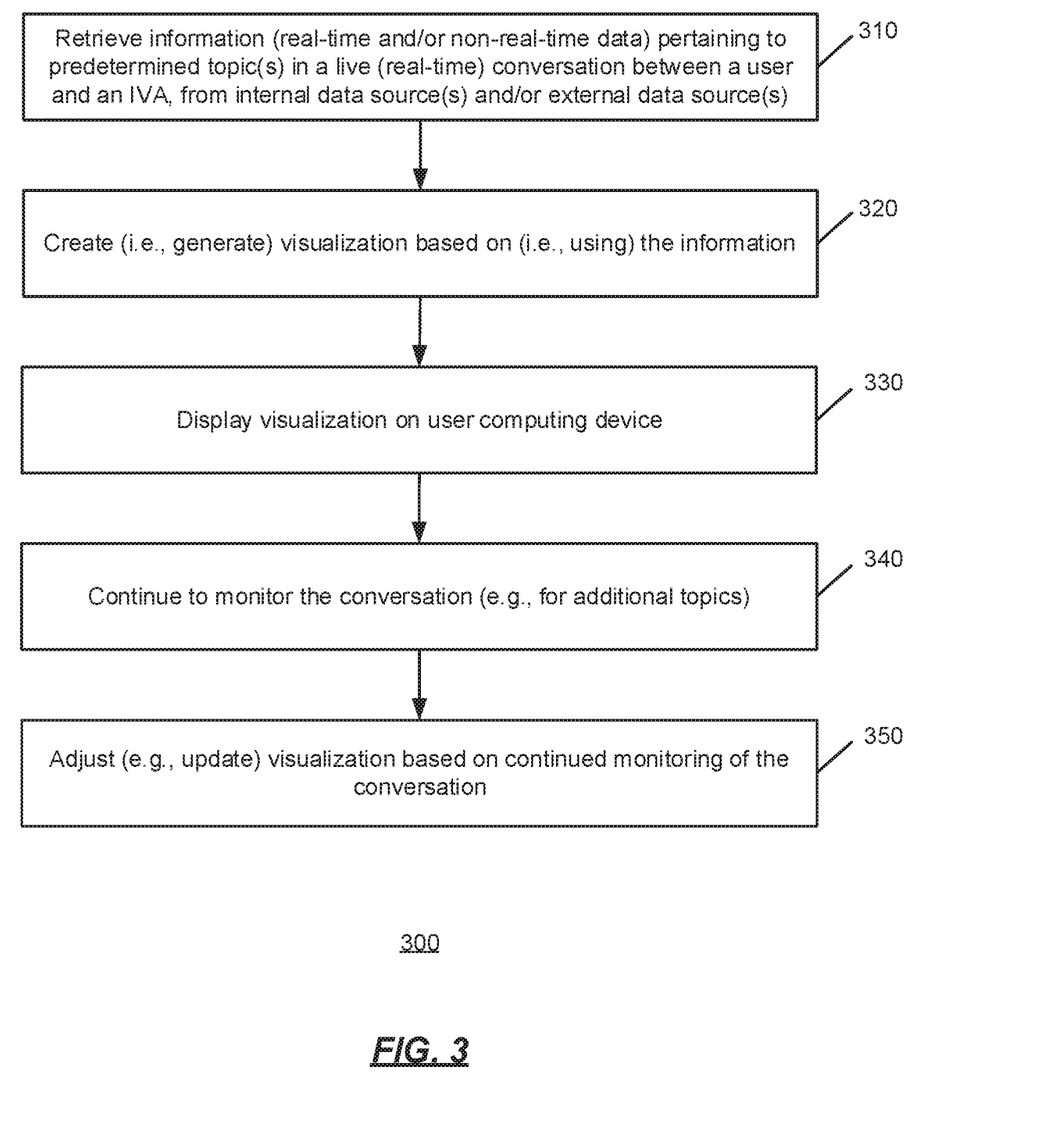
FIG. 3 is an operational flow of another implementation of a method of providing a visualization to a user computing device during a conversation between a user and an IVA.

FIG. 3 is an operational flow of another implementation of a method 300 of providing a visualization 198 to a user computing device 105 during a conversation between a user 102 and an IVA 157.

At 310, similar to 240, information pertaining to an identified predetermined topic (during a live or real-time conversation between a user 102 and an IVA 157) is retrieved or otherwise obtained from the data source(s) that had been associated with that topic previously (e.g., by an administrator or other user associated with the entity 152 or the IVA 157). Each data source may be real-time or non-real-time, and may be an internal data source or an external data source. The information (i.e., the real-time and/or non-real-time data) may be retrieved or otherwise obtained by the data gathering module 114. The retrieved data may then processed by the data processing module 116 if appropriate depending on the implementation.

At 320, similar to 250, one or more visualizations are created (i.e., generated) by the visualization generation module 118, and transmitted or otherwise provided to the user computing device 105 for display at 330.

At 340, the conversation is continued to be monitored. The monitoring may be continuous, periodic, or randomly timed, depending on the implementation. As additional topics are identified, and/or the previous topic (used in 310) is identified, the visualization may be updated at 350 by creating a new and/or updated visualization (e.g., using processing similar to that described with respect to 310, 320, 330). The new and/or update visualization may be displayed on the user computing device 105 as a replacement to the previously displayed visualization (e.g., from 330) or may be displayed on the user computing device 105 as supplemental to a previously displayed visualization, depending on the implementation.

Figure 4:
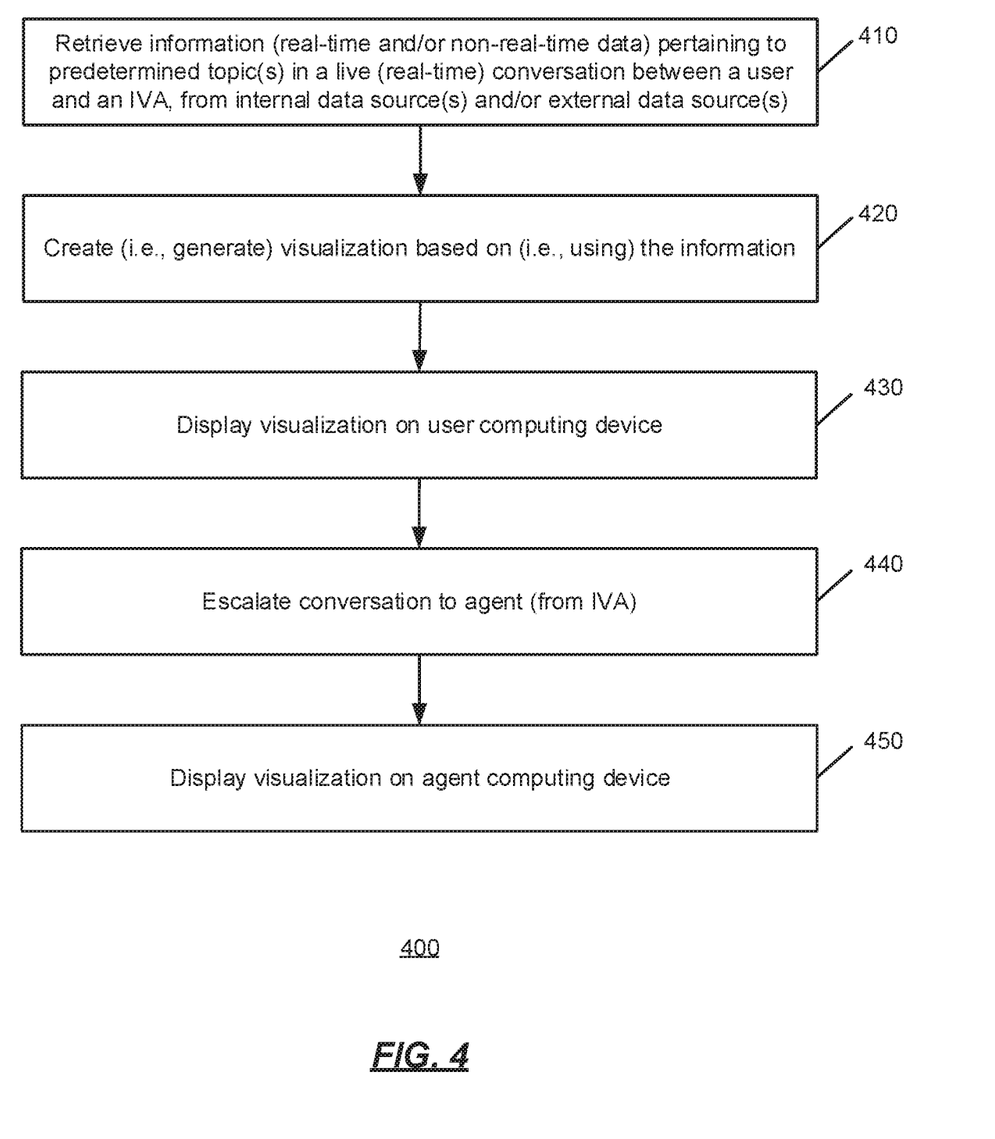
FIG. 4 is an operational flow of another implementation of a method of providing a visualization to a user computing device during a conversation between a user and an IVA.

FIG. 4 is an operational flow of another implementation of a method 400 of providing a visualization 198 to a user computing device 105 during a conversation between a user 102 and an IVA 157.

At 410, similar to 310, information pertaining to an identified predetermined topic (during a live or real-time conversation between a user 102 and an IVA 157) is retrieved or otherwise obtained from the data source(s) that had been associated with that topic previously (e.g., by an administrator or other user associated with the entity 152 or the IVA 157). Each data source may be real-time or non-real-time, and may be an internal data source or an external data source. The information (i.e., the real-time and/or non-real-time data) may be retrieved or otherwise obtained by the data gathering module 114. The retrieved data may then processed by the data processing module 116 if appropriate depending on the implementation.

At 420, similar to 320, one or more visualizations are created (i.e., generated) by the visualization generation module 118, and transmitted or otherwise provided to the user computing device 105 for display at 430.

At 440, at some point, the conversation between the user 102 and the IVA 157 is escalated to an agent (associated with the entity 152 or the IVA 157). This may occur for any of a variety of known reasons and be implemented using known techniques.

At 450, the visualization that was created at 420 and displayed on the user computing device at 430 is also provided to, and displayed on, the agent computing device. In this manner, both the user and the agent are provided with the visualization (and any updates to the visualization) on their respective displays during the conversation.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for providing a visualization is provided. The system includes: an intelligent virtual assistant (IVA) configured to receive natural language processing (NLP) inputs from a user computing device; and a computing device in communication with the IVA and configured to generate a visualization based on the NLP inputs and provide the visualization for display on the user computing device.

Implementations may include some or all of the following features. The system further comprises at least one of an internal data source or an external data source, wherein the computing device is configured to receive data from the internal data source or the external data source and generate the visualization based on the received data. The data comprises real-time data. The internal data source comprises at least one of email, live chat logs, call center audio transcripts, website search queries, and customer service channels, and the external data source comprises a source of at least one of weather data, travel data, retail data, service data, transportation data, financial data, health and wellness data, inventory data, and restaurant data. The computing device is configured to provide the visualization for display on a computing device of an agent. The NLP inputs relate to at least one of a plurality of predetermined topics. The computing device is configured to adjust the visualization based on further NLP inputs received from the user computing device. The visualization is based on a first topic, and the adjusted visualization is based on a second topic that is different from the first topic. The visualization is based on a first topic, and the adjusted visualization is based on the first topic.

In an implementation, a method for providing a visualization is provided. The method includes: monitoring a conversation between a user computing device and an intelligent virtual assistant (IVA); generating a visualization based on a topic in the conversation; and providing the visualization for display on the user computing device.

Implementations may include some or all of the following features. The method further comprises establishing the conversation between the user and the IVA. The conversation comprises natural language processing (NLP) inputs from the user computing device. Monitoring the conversation between the user computing device and the IVA comprises determining the topic in the conversation, wherein the topic is one of a plurality of predetermined topics. The method further comprises retrieving data from at least one of an internal data source or an external data source based on the topic, wherein generating the visualization comprises using the retrieved data. The data comprises real-time data. The internal data source comprises at least one of email, live chat logs, call center audio transcripts, website search queries, and customer service channels, and the external data source comprises a source of at least one of weather data, travel data, retail data, service data, transportation data, financial data, health and wellness data, inventory data, and restaurant data. The method further comprises updating the visualization for display on the user computing device based on the topic or on another topic in the conversation. The method further comprises providing the visualization for display on a computing device of an agent.

In an implementation, a system for providing a visualization is provided. The system includes: a visualization determination module configured to monitor a conversation between a user computing device and an intelligent virtual assistant (IVA); a data gathering module configured to retrieve data from at least one of an internal data source or an external data source based on a topic in the conversation; a data processing module configured to process the retrieved data; and a visualization generation module configured to generate a visualization based on the processed data and provide the visualization for display on the user computing device.

Implementations may include some or all of the following features. The system further comprises at least one of an internal data source or an external data source configured to provide the data to the data gathering module, wherein the internal data source comprises at least one of email, live chat logs, call center audio transcripts, website search queries, and customer service channels, and wherein the external data source comprises a source of at least one of weather data, travel data, retail data, service data, transportation data, financial data, health and wellness data, inventory data, and restaurant data.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for providing a visualization, the system comprising:
    an intelligent virtual assistant (IVA) configured to receive natural language processing (NLP) inputs from a user computing device during an active IVA session comprising a real-time conversation with a user of the user computing device;
    a computing device in communication with the IVA and configured to generate the visualization based on the NLP inputs and provide the visualization for display on the user computing device by:
        determining, during the active IVA session, a current context and sentiment associated with at least a portion of the NLP inputs,
        identifying a data source for the visualization based at least in part on the current context and sentiment,
        identifying a visualization format in accordance with the current context,
        generating, based on data received from the data source and during the active IVA session, the visualization in the visualization format,
        in response to detecting a predetermined topic, retrieving additional data pertaining to the predetermined topic from the data source; and
        updating the visualization based at least in part on the additional data, wherein the visualization is continuously updated based on monitoring of the IVA session; and
    a second user computing device in communication with the IVA and the user computing device configured to:
        in response to receiving an escalation indication associated with the active IVA session from the IVA, output a current visualization to the second user computing device.

2. The system of claim 1, wherein the data source comprises at least one of an internal data source or an external data source.

3. The system of claim 2, wherein the data comprises real-time data.

4. The system of claim 2, wherein the internal data source comprises at least one of email, live chat logs, call center audio transcripts, website search queries, and customer service channels, and wherein the external data source comprises a source of at least one of weather data, travel data, retail data, service data, transportation data, financial data, health and wellness data, inventory data, and restaurant data.

5. The system of claim 1, wherein the second user computing device is associated with an agent.

6. The system of claim 1, wherein the NLP inputs relate to at least one of a plurality of predetermined topics.

7. The system of claim 1, wherein the computing device is configured to adjust the visualization based on further NLP inputs received from the user computing device.

8. The system of claim 1, wherein the visualization is updated for a predetermined length of time or until a detected occurrence of a predetermined event.

9. A method for providing a visualization, the method comprising:

monitoring a conversation between a user computing device and an intelligent virtual assistant (IVA);

determining, during the conversation, a current context and sentiment associated with the conversation;

identifying a data source for the visualization based at least in part on the determined context and sentiment;

identifying a visualization format in accordance with the current context;

generating, during the conversation and based on data received from the data source, the visualization in the visualization format based at least in part on a first predetermined topic in the conversation;

providing the visualization for display on the user computing device;

in response to detecting a second predetermined topic, retrieving additional data pertaining to the second predetermined topic from the data source;

updating the visualization based at least in part on the additional data, wherein the visualization is continuously updated based on the monitoring of the conversation; and in response to receiving, by a second user computing device, an escalation indication associated with the conversation from the IVA, outputting a current visualization to the second user computing device.

10. The method of claim 9, further comprising establishing the conversation between the user and the IVA.

11. The method of claim 9, wherein the conversation comprises natural language processing (NLP) inputs from the user computing device.

12. The method of claim 9, wherein monitoring the conversation between the user computing device and the IVA comprises determining the topic in the conversation, wherein the topic is one of a plurality of predetermined topics.

13. The method of claim 12, wherein the data source comprises at least one of an internal data source or an external data source.

14. The method of claim 13, wherein the data comprises real-time data.

15. The method of claim 13, wherein the internal data source comprises at least one of email, live chat logs, call center audio transcripts, website search queries, and customer service channels, and wherein the external data source comprises a source of at least one of weather data, travel data, retail data, service data, transportation data, financial data, health and wellness data, inventory data, and restaurant data.

16. The method of claim 9, further comprising updating the visualization for display on the user computing device based on the topic or on another topic in the conversation.

17. The method of claim 9, wherein the second user computing device is associated with an agent.

18. A system for providing a visualization, the system comprising:

a visualization determination module configured to: (i) monitor a conversation between a user computing device and an intelligent virtual assistant (IVA), and (ii) determine a current context and sentiment associated with the conversation;

a data gathering module configured to: (i) identify an internal data source or an external data source for the visualization based at least in part on the current context and sentiment, and (ii) retrieve data from at least one of the internal data source or the external data source based at least in part on a first predetermined topic in the conversation;

a data processing module configured to: (i) identify a visualization format in accordance with the current context and sentiment, and (ii) process the retrieved data; and a visualization generation module configured to: (i) generate the visualization based on the processed data in the visualization format, (ii) provide the visualization for display on the user computing device, (iii) in response to detecting a second predetermined topic, retrieve additional data pertaining to the second predetermined topic from the internal data source or the external data source, and (iv) update the visualization based at least in part on the additional data, wherein the visualization is continuously updated based on monitoring of the conversation wherein:

a second user computing device is in communication with the IVA and the user computing device, and the second user computing device is configured to, in response to receiving an escalation indication associated with the conversation from the IVA, output a current visualization to the second user computing device.

19. The system of claim 18, wherein the internal data source comprises at least one of email, live chat logs, call center audio transcripts, website search queries, and customer service channels, and wherein the external data source comprises a source of at least one of weather data, travel data, retail data, service data, transportation data, financial data, health and wellness data, inventory data, and restaurant data.

* * * * *